United States Patent [19]

Gavrila

[11] Patent Number: 5,141,012
[45] Date of Patent: Aug. 25, 1992

[54] CARTRIDGE-TYPE DISCONNECTABLE PRESSURE RELIEF VALVE SYSTEM

[75] Inventor: Gelu N. Gavrila, Parsippany, N.J.

[73] Assignee: Teledyne Industries, Inc., Los Angeles, Calif.

[21] Appl. No.: 697,672

[22] Filed: May 9, 1991

[51] Int. Cl.⁵ ............................................. F16K 43/00
[52] U.S. Cl. ...................................... 137/15; 137/329.1; 137/454.6; 137/474
[58] Field of Search ................. 137/15, 329.1, 329.4, 137/454.2, 454.4, 454.5, 454.6, 474, 533.29, 533.31, 538, 540, 542, 614.05, 614.19; 251/80

[56] References Cited

U.S. PATENT DOCUMENTS

| | | | |
|---|---|---|---|
| 773,641 | 11/1904 | Hayden | 137/474 |
| 1,265,670 | 5/1918 | Kaier . | |
| 1,383,272 | 6/1921 | Woore . | |
| 1,645,156 | 10/1927 | Rowe | 137/329.1 |
| 2,463,493 | 3/1949 | Norway . | |
| 2,469,946 | 5/1949 | Bremer . | |
| 2,645,242 | 7/1953 | Monnich | 137/538 X |
| 2,705,102 | 3/1955 | Slattery . | |
| 2,771,308 | 11/1956 | Vitcha et al. . | |
| 2,775,256 | 12/1956 | Hanson . | |
| 2,865,401 | 12/1958 | Majneri . | |
| 3,006,361 | 10/1961 | Reinemann | 137/454.5 |
| 3,109,454 | 11/1963 | Whitlock et al. . | |
| 3,559,689 | 2/1971 | Dunbar et al. . | |
| 3,587,634 | 6/1971 | Krause . | |
| 4,190,075 | 2/1986 | Kayser . | |
| 4,465,093 | 8/1984 | Gold et al. | 137/462 X |
| 4,509,554 | 4/1985 | Failla . | |
| 4,532,958 | 8/1985 | Napolitano | 137/454.2 |
| 4,679,584 | 7/1987 | Wolff | 137/543.19 X |
| 4,718,448 | 1/1988 | Love et al. . | |
| 4,953,592 | 9/1990 | Takahashi et al. . | |

Primary Examiner—Stephen M. Hepperle
Attorney, Agent, or Firm—Beveridge, DeGrandi & Weilacher

[57] ABSTRACT

A relief valve system which is made up of a valve bowl with inlet housing, a relief valve cartridge, a stop valve system, a releasable securement system, and a manual by-pass valve. The relief valve cartridge is a self-contained relief valve which is easily inserted into a reception area formed in the inlet port housing so as to be in line with the inlet port leading to a high pressure source. The stop valve system includes a spring biased poppet valve with a contact shroud that is placed in contact with the upstream end of the cartridge when the cartridge is inserted into the reception area. When the cartridge is inserted the stop valve is in a non-sealing state with respect to the inlet port. When the cartridge is removed the stop valve shifts to a sealing position. At the time a cartridge is removed for servicing a pretested cartridge is inserted in place of the removed cartridge. A by-pass valve is provided to equalize the pressure differential on the stop valve when the replacement cartridge is being inserted into the reception area.

22 Claims, 6 Drawing Sheets

CARTRIDGE-TYPE DISCONNECTABLE PRESSURE RELIEF VALVE SYSTEM

FIELD OF THE INVENTION

The present invention relates to a pressure relief valve system having a disconnectable relief valve cartridge, a stop valve system, and an upstream manual by-pass valve system.

BACKGROUND

Regulations and codes, such as the ASME Boiler and Pressure Vessel Code, require that pressure relief valves be serviced periodically to warrant and check for the correct set pressure, mass flow rate and functional stability. Servicing of pressure relief valves is typically conducted one to two times a year and often mid to large sized facilities have in excess of 200 to 1,000 pressure relief valves operating within their system. Hence, it is evident that a large amount of labor is required in complying with the regulations and codes. Of course, if such regulations and codes are not followed, catastrophes involving the release of toxic fumes such as that which occurred in Bhopal, India can result. Also, since having to shut down a facility to service pressure relief valves is ecomonically detrimental, it is desirable that such servicing occur without process interruption.

The prior art devices presently being utilized for the servicing of safety and pressure relief valves without process interruption feature the installation of two redundant safety relief valves. In general, three different valve systems have evolved in attempting to achieve servicing of pressure relief valves without process interruption. The three systems generally relied upon are as follows:

(1) A system with two separate vessel penetrations with mechanically linked block valves;
(2) A system with a 3-way block valve; and
(3) Safety selector valves with a movable isolation disk and a single inlet and outlet.

The above noted prior art designs require, in addition to a redundant pressure relief valve, additional piping fabrications and additional block valves or switch-over valves. The above noted prior art systems are relatively costly and also lead to various problems such as (1) high inlet pressure drop (which in turn leads to valve instabilities), (2) high maintenance requirements, (3) reliability problems associated with the valve system's relatively complex systems, and (4) the problem of the combination discharge bursting disk and valve discharge capacity.

SUMMARY OF THE INVENTION

The present invention provides a safety valve relief system which avoids the above-noted problems associated with the prior art. Moreover, the present invention provides a cost effective and reliable solution to the problems associated with no process interruption maintenance of pressure systems protected by self-actuated spring loaded pressure relief valves. In addition, the present invention provides a system which adds an added degree of freedom in the areas of interchangeability and versatility—features not provided for in the prior art.

The present invention features a pressure relief valve system that includes a valve bowl with an inlet port housing that has an inlet port formed therein. The inlet port is in fluid communication with both a fluid pressure source and an outlet exhaust passageway formed in the valve bowl housing. The valve bowl housing also has an aperture formed therein and means for securing the valve bowl and inlet port housing to the fluid pressure source.

The relief valve system further includes a self-contained relief valve cartridge similar to that disclosed in U.S. Pat. No. 4,979,540 to the present inventor which is incorporated herein by reference. The self-contained relief valve cartridge has a housing with a guide member at an upstream end. The guide member includes an open upstream end and one or more (e.g. six) radial fluid ports extending radially through the guide member. Both a disk and biasing means is positioned within the cartridge housing and the biasing means preferably includes a helical spring and stem which extends into contact with the disk.

A nozzle member is secured to the guide member between the open end of the guide member and the radial fluid ports. The nozzle member includes a valve seat and the biasing means biases the disk into contact with the valve seat of the nozzle member. The biasing means also preferably includes a first and a second button attached to the stem with the biasing spring positioned between the first and second buttons. The nozzle member has an upstream end commensurate with the upstream end of the guide member, such that the upstream end of the guide member and the upstream end of the nozzle member lie essentially on a common plane. In a preferred embodiment, the nozzle includes a convergent-divergent passageway.

The relief valve cartridge further comprises a diskholder slidingly retained between an interior surface of the guide member and an exterior surface of the disk. The diskholder has an inclined free end which is adapted to partially block the radial fluid ports formed in the guide member. The disk supports the diskholder and the diskholder is secured to the disk by a wave spring member such that the diskholder is free to move with respect to the guide member and with respect to the disk. The disk is also adapted to lift off said nozzle member and the diskholder is adapted to shift with respect to said disk while the disk is moving. The wave spring is positioned between a ring attached to the disk and a portion of the diskholder.

The relief valve system of the present invention also includes releasable securement means for releasably securing the cartridge within the valve bowl such that the cartridge extends through the aperture formed in the valve bowl and into fluid communication with the inlet port of the valve bowl. In a preferred embodiment, the guide member has a central axis which coincides with the central axis of the inlet port and the fluid outlet passageway has a central axis which is transverse to the central axis of the guide member. The nozzle member preferably includes a valve seat at a downstream end which has an outer periphery that is of a diameter which is essentially the same as that of the disk. The valve seat is preferably positioned such that a plane lying flush on the valve seat extends through the radial fluid port(s) formed in the guide member. The nozzle member is also preferably threadably engaged with the guide member.

The inlet port housing includes a downstream reception end having a recessed guide defined by a cylindrical wall and a reception surface for contacting the upstream end of the cartridge. The interior surface of the cylindrical wall is adapted to frictionally engage, at the upstream end of the guide member, a first sealing ring provided between the cylindrical wall and the guide member. A second sealing ring is provided between the reception surface and the upstream end of the nozzle.

The releasable securement means includes a ring with an interior surface adapted for contact with an exterior surface of the cartridge and fastening means for fastening the ring to the valve bowl while urging the open end of the guide member into contact with the recessed guide and reception surface of the inlet port housing. The releasable securement means also has a frusto-conical interior surface which diverges away from the exterior surface of the cartridge. An elastomeric ring is positioned between the interior surface of the ring and the exterior surface of the cartridge.

The pressure relief valve system further comprises a stop valve system which has a contact member, a valve head member, attachment means for connecting the head member to the contact member, and a biasing system. The contact member is positioned in contact with the upstream end of the cartridge and the biasing system is in a compressed state when the cartridge is secured within the valve bowl and the head member is in a non-sealing inlet port position. The head member is dimensioned and arranged such that when the cartridge is removed from the valve bowl, the biasing means decompresses so as to position the head member in contact with the seal surface provided in the inlet port.

The contact member includes a ring-shaped shroud member, a central hub and supporting vanes extending between the hub and shroud member. The shroud member is also placed in contact with the upstream end of the cartridge so as to form part of the reception surface. The inlet port housing includes a ring-shaped recess and the shroud member is received within that recess such that the shroud member is placed in contact with the nozzle member when the biasing system is compressed and the inlet port passageway is unobstructed by the shroud. The head member has a sloping surface which corresponds with a sloping portion of the inlet port forming the seat portion.

The biasing system for the stop valve includes a threaded shroud member fixedly received in a second ring-shaped recess formed in an interior surface of the inlet port. The biasing system also includes a guiding hub and support vanes extending between said guiding hub and threaded shroud. The attachment means includes a stem slidably received within the guiding hub.

The present invention further comprises a first fluid communication line formed in the inlet port housing so as to have a first end opening into the inlet port downstream of the head member. Also, a second fluid communication line is formed in the inlet port housing so as to have a first end opening into the inlet port upstream of the head member (when the head member is in a sealing position). The first and second fluid communication lines each have a second end opening into a plug hole formed in the inlet port housing. A sealing plug is received within the plug hole and adapted to assume a first position wherein the second ends of the first and second fluid communication lines are sealed and a second position wherein said first and second fluid communication lines are in fluid communication with one another.

The present invention provides a method for servicing pressure relief valves positioned within a relief valve system without process interruption. The method includes releasing the releasable securement means securing the upstream end of the relief valve cartridge within the hollow interior formed in the valve bowl. During this time the main biasing means of the relief valve cartridge is in contact with a valve disc and a guide member surrounds the valve disc. The guide member has an upstream open end and one or more radial ports positioned downstream from the upstream open end while the nozzle member has an upstream open end and a downstream open end covered by the biased valve disc.

The method further includes removing the relief valve cartridge such that the upstream end of the relief valve cartridge is positioned outside of the hollow interior formed in the valve bowl while the valve disc is maintained biased in sealed contact with the downstream end of the nozzle member such that the relief valve cartridge maintains the same state both prior to and after removal from the valve bowl. The step of removing the relief valve cartridge out of the hollow interior formed in the valve bowl causes the stop valve previously biased in a non-sealing position by the upstream end of the relief valve cartridge to move to a sealing position with respect to the inlet port extending into the hollow interior of the valve bowl.

As noted, the inlet port housing has its recessed guide positioned within the hollow interior so as to place the rim of the recessed guide upstream (and below if the cartridge extends vertically upward) from the one or more radial ports formed in the guide member. Removal of the relief valve cartridge includes sliding the upstream end of the guide member out of the recessed guide and eventually out of the valve bowl.

The step of sliding the upstream end of the cartridge within the valve bowl includes maintaining the cartridge's central axis parallel with the central axis of the guide recess. The step of releasing the releasable securement means includes detaching the ring (having a central axis parallel with the central axis of the aperture formed in the valve bowl and an interior surface in contact with a housing of the relief valve cartridge) from engagement with the valve bowl. The nozzle member has an upstream end commensurate with an upstream end of the guide member and the nozzle member is moved from a position wherein the nozzle is in contact with the stop valve shroud to a position wherein the nozzle is free from contact with the stop valve shroud.

The relief valve system of the present invention requires only a single relief valve cartridge positioned in fluid communication with a main fluid system and the step of removing the single relief valve cartridge results in essentially no flow interruption.

The method of the present invention further comprises the step of inserting a replacement relief valve cartridge in the position previously assumed by the removed cartridge. The time period within which the main line is without relief valve protection is the time period which extends from the time the stop valve moves to a sealing position to the time the insertion of the replacement cartridge is complete such that the stop valve is in a non-sealing position This time period is typically 1 to 3 minutes which is less than the minimum pressure system response time.

The method of the present invention further comprises resecuring the releasable securement means such that the second relief valve cartridge is secured in position with an upstream end of the second relief valve cartridge in line with the inlet port extending into the hollow interior of the valve bowl.

In addition, the method involves opening a by-pass valve by unthreading a sealing plug after the upstream end of the replacement cartridge is placed in sealing contact with the inlet housing's recessed guide but prior to contact with the stop valve shroud. Once the plug is withdrawn from sealing contact relatively high pressured fluid positioned upstream of the sealing stop valve flows around the stop valve and into a lower pressure section of the inlet port downstream of the stop valve so as to reduce the pressure differential upstream and downstream of the stop valve

BRIEF DESCRIPTION OF THE DRAWINGS

The present invention will be more fully understood form the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
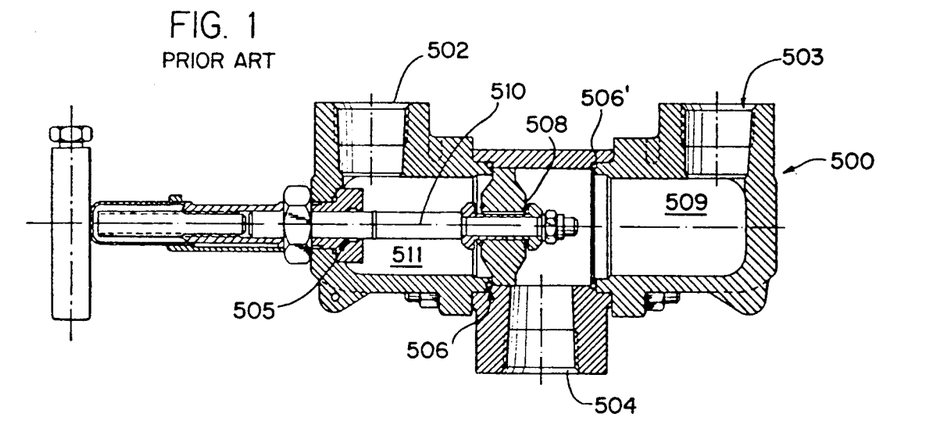
FIG. 1 shows a cross-sectional view of a prior art spool style safety selector valve.

FIG. 1 is illustrative of one of the prior art devices used for the servicing of safety and pressure relief valves with no process interruption. FIG. 1 illustrates a spool style safety selector valve having first seat 502 for receiving a first pressure relief valve (not shown) and second seat 503 for receiving a second pressure relief valve (not shown). FIG. 1 also shows inlet 504 and isolation disc 508 which is in contact with seal 506 to create active fluid passageway 509 and inactive fluid passageway 511. Spool rod 510 is sealed within packing 505 and is used in the switching of isolation disk from contact with seal 506 to contact with seal 506'. FIG. 1 thus illustrates the redundancy of the prior art system in utilizing a first and second relief valve simultaneously as well as redundant piping and associated equipment used for placing only one of the two relief valves in line.

Figure 2:
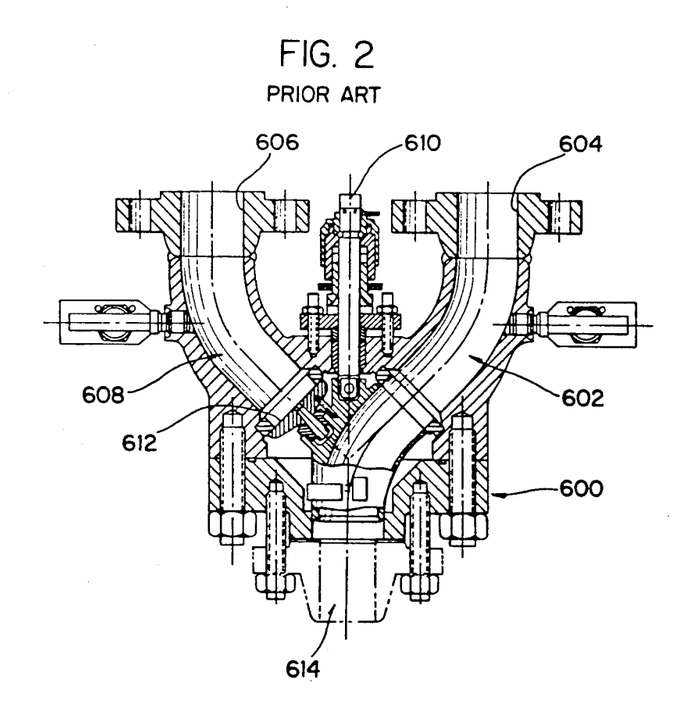
FIG. 2 shows a cross-sectional view of a prior art tandem safety selector switch valve.

FIG. 2 illustrates another prior art device used for the servicing of safety and pressure relief valves with no process interruption. FIG. 2 shows a tandem safety selector valve 600 having active flow conduit 602 and inactive flow conduit 608 with isolation disk 612 and switch over assembly 610 therebetween. FIG. 2 also shows seats 604 and 606 which receive an active pressure relief valve and an inactive pressure relief valve. Again, the prior art system in FIG. 2 illustrates the redundant use of relief valves and associated piping as well as a relatively complex flow conduit sealing assembly which is susceptible to leakage and breakdowns.

Figure 3:
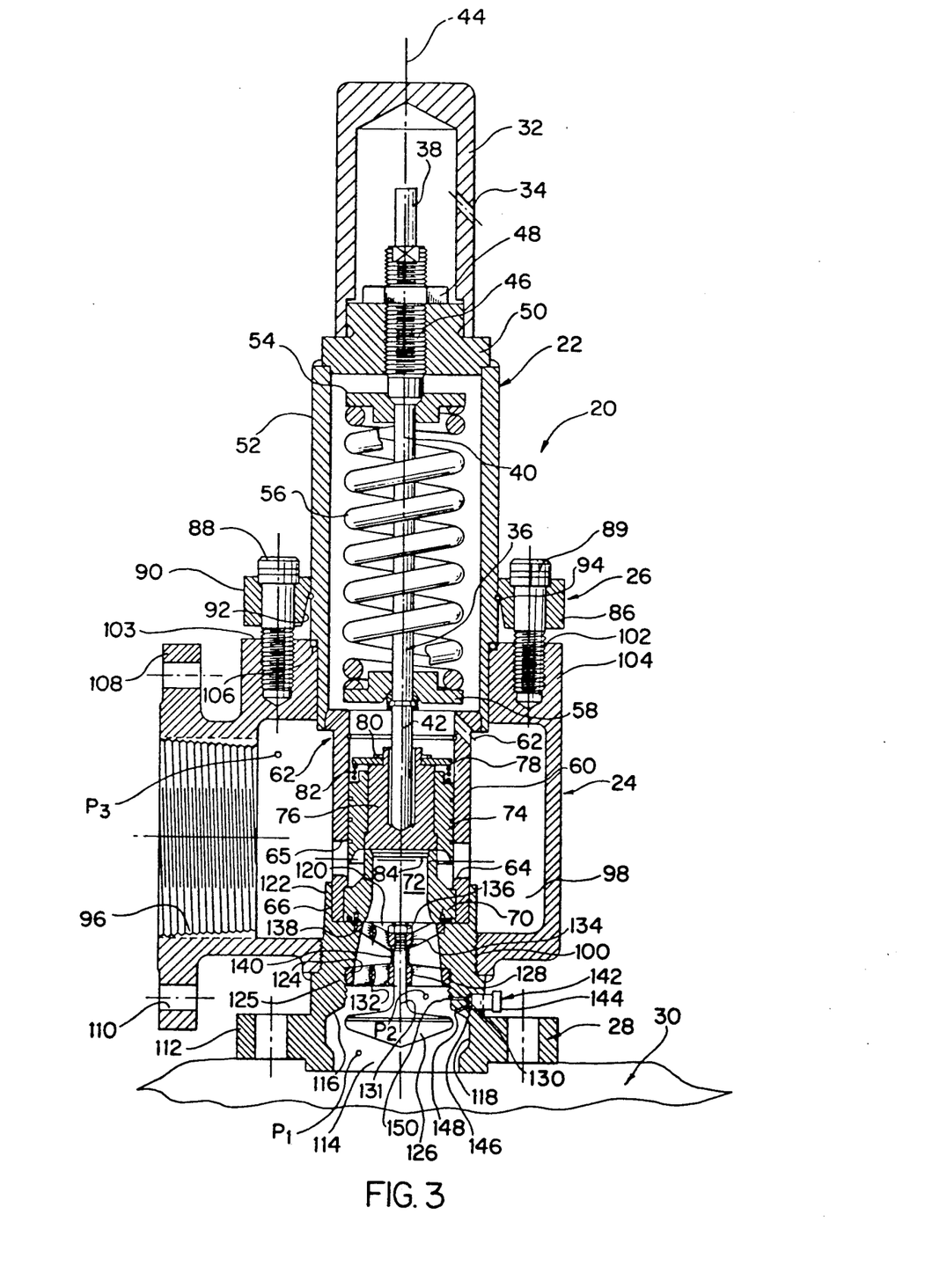
FIG. 3 shows a cross-sectional elevational view of the relief valve system of the present invention with a relief valve cartridge secured in operating position.
Figure 4:
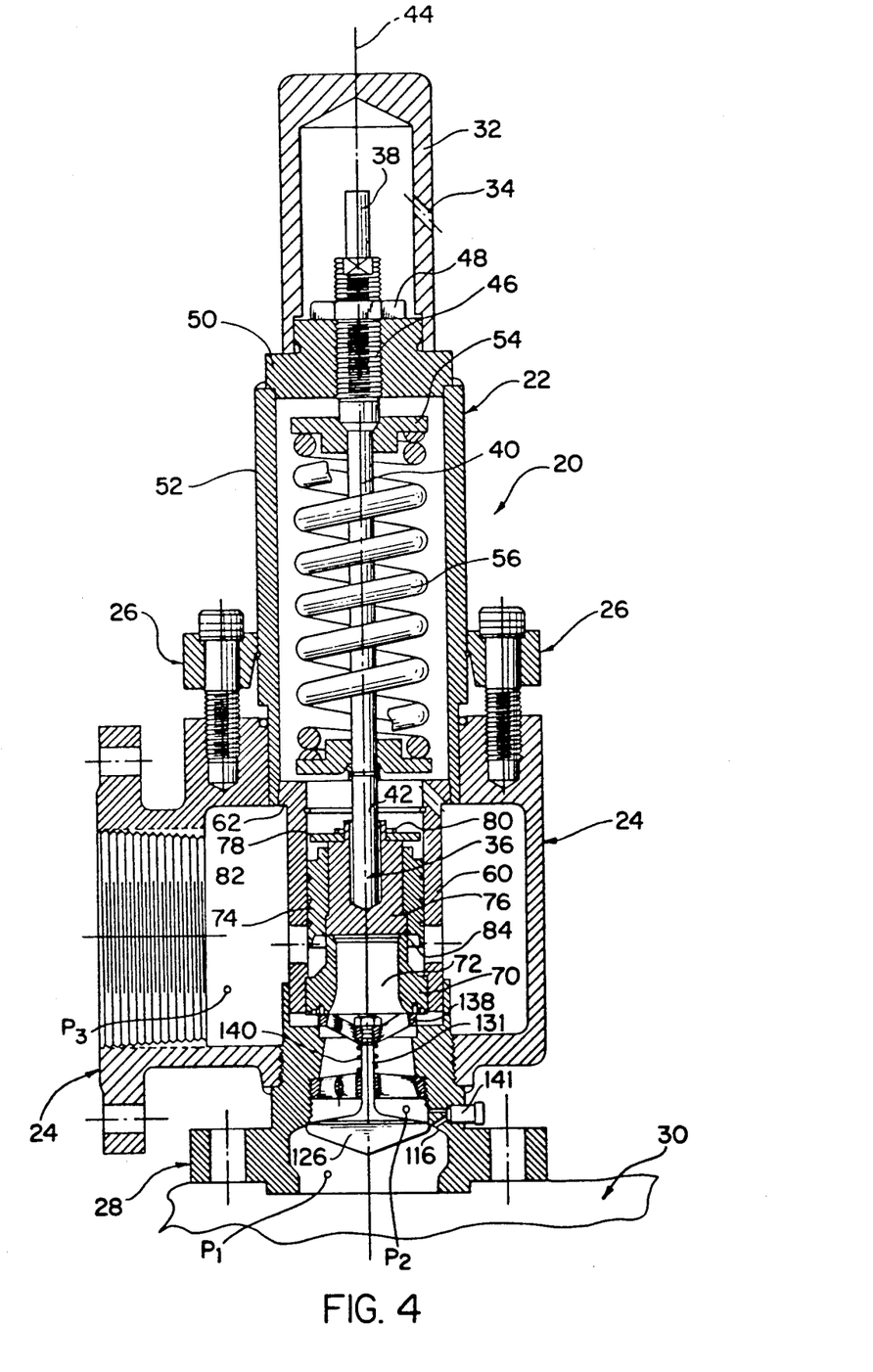
FIG. 4 illustrates the relief valve cartridge in the preliminary stages of being removed or in the later stage of being inserted;.
Figure 5:
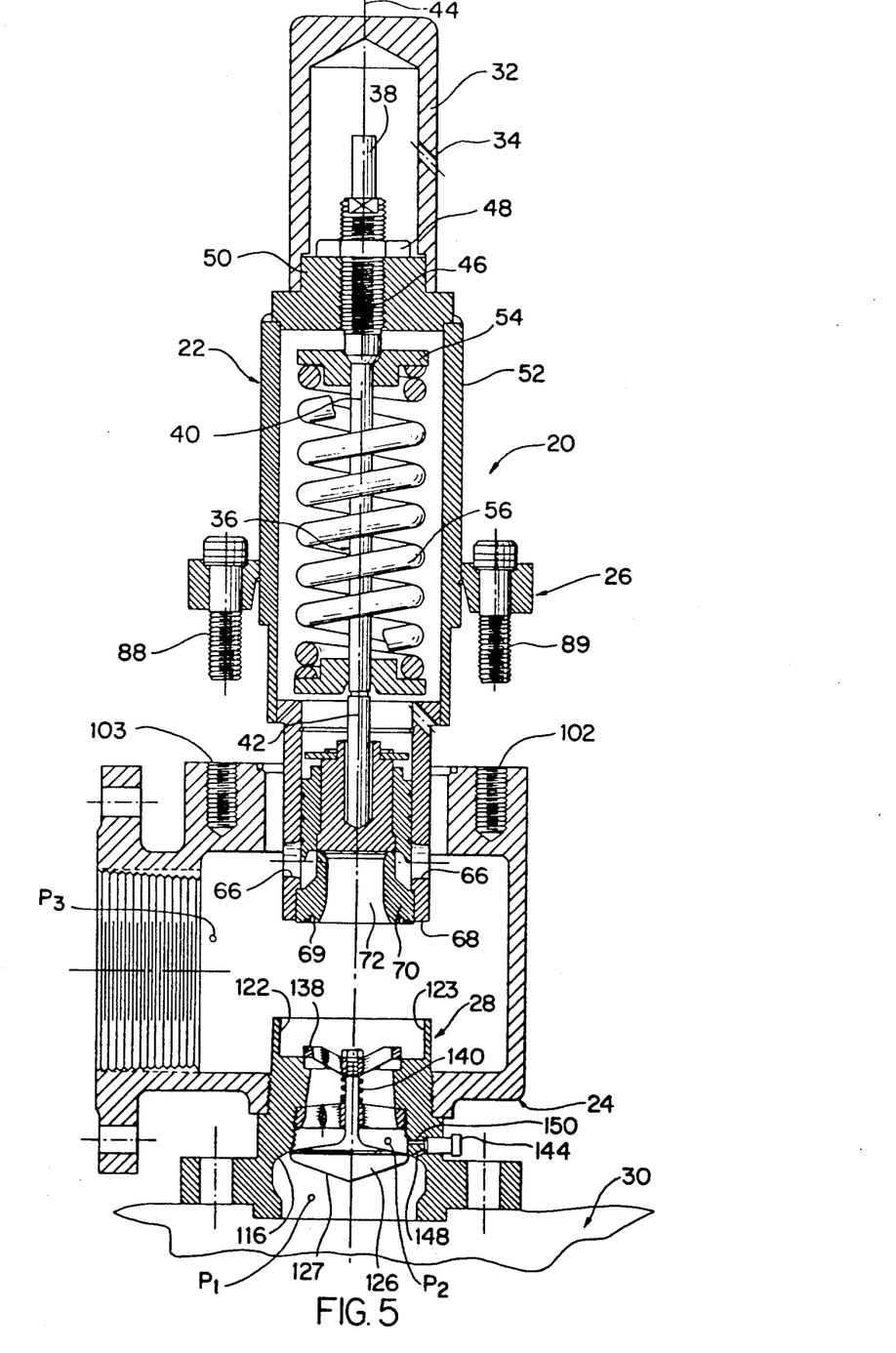
FIG. 5 shows a cross-sectional view of the present invention with the relief valve cartridge nearly completely withdrawn or in the preliminary stages of insertion.

FIGS. 3-5 illustrates a cross-sectional view of the present invention's pressure relief valve system 20 which includes relief valve cartridge 22 extending into valve bowl 24. Cartridge 22 is received in inlet port housing 28 which is integral (e.g. threadably received or cast as a single unit) with valve bowl 24. Relief valve system 20 also includes releasable securement means 26 for securing cartridge 22 in operating position. Inlet port housing 28 is also shown to be secured to fluid pressure source 30 at a flanged extension of housing 28.

Figure 8:
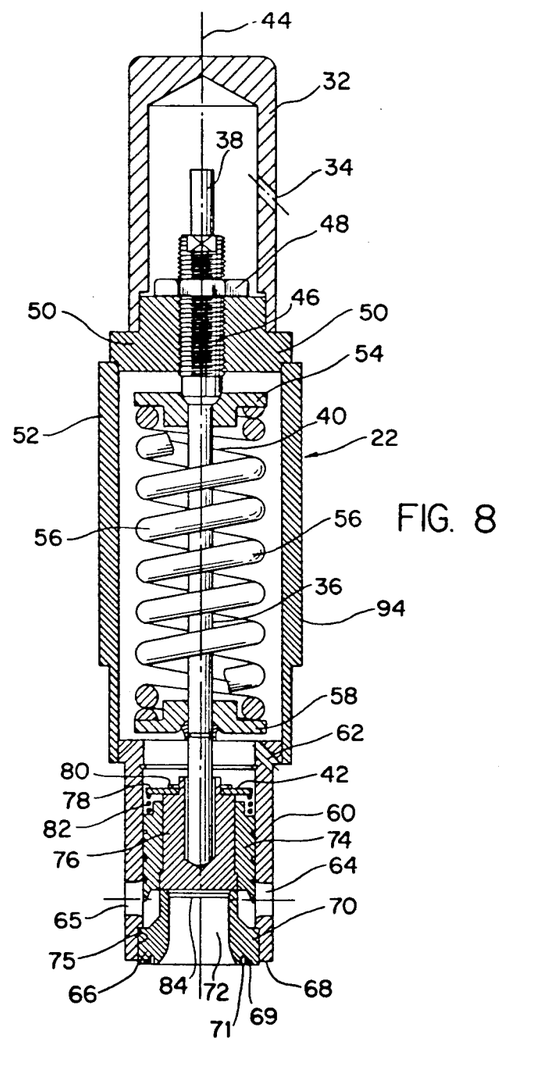
FIG. 8 shows a cross-sectional view of the self-contained relief valve cartridge of the present invention.

As illustrated in FIGS. 3-5 and, more particularly, in FIG. 8, cartridge 22 includes cap 32 which is releasably attached to fixed cover 50 and positioned so as to cover exterior stem section 38 extending from adjusting screw 46. Cap 32 includes a port 34 at one side. Jam nut 48 is provided to maintain adjusting screw 46 at the desired setting. Stem 36 has, in addition to exterior stem section 38, intermediate stem section 40 and interior stem section 42. Intermediate stem section 40 extends from the interior end of adjusting screw 36. First and second buttons 54, 58 are retained in spaced apart position on intermediate stem section 40 and biasing means 56 extends between buttons 54, 58 and also around intermediate stem section 40. Cartridge housing 52 surrounds intermediate stem section 40, spring buttons 54, 58, and biasing means 56.

Cartridge housing 52 includes at its interior end guide member 60 which has sloped fluid ports 62 at its exterior end. Guide member 60 has one or more radially extending guide ports (two shown 64, 65) positioned downstream of the open end 68 (FIG. 5) of guide member 60. Guide member 60 also includes threaded guide member section 66 positioned between the open end 68 and guide ports 64, 65. Threadably secured at the open end 68 is nozzle member 70. Nozzle member 70 includes a convergent/divergent fluid passageway 72 and at its downstream end includes valve seat 84 (FIG. 4) and at its upstream end seal 69 (FIG. 5).

Interior stem section 42 extends into a recess formed in disk 76 and is biased towards valve seat 84. Disk 76 has an outer periphery which is essentially the same as the outer periphery of valve seat 84. Between the exterior of disk 76 and the interior of guide member 60 is positioned disk holder 74 which is supported by disk ring 78 attached to disk 76 with end clip 80. Spring 82 extends between disk ring 78 and disk holder 74. Disk holder 74 includes an inclined surface at its end that is positioned such that, when spring 82 is not sufficiently compressed, the inclined end is in fluid contact with fluid passing past valve seat 84 and through to radial ports 64, 65. Valve seat 84 is positioned such that a plane lying flush on valve seat 84 extends through radial guide ports 64 and 65.

Figure 9:
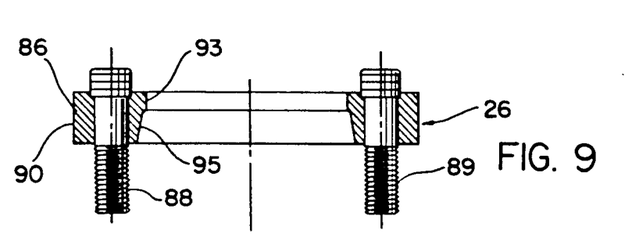
FIG. 9 shows a cross-sectional view of the releasable securement means of the present invention.

FIGS. 3, 4, 5 and, more particularly, FIG. 9 illustrate releasable securement means 26 which secures cartridge 22 in position with respect to valve bowl 24. Releasable securement means 26 comprises ring 86 with outer periphery 90 and inner periphery 92. Inner periphery 92 includes first section 93 and second section 95. First section 93 has a first diameter which corresponds with the outer diameter of housing 52 and a second section 95 which includes an outwardly sloping surface with an average diameter that is greater than the first diameter. In the area between first section 93 and second section 95 is a recess which receives sealing ring 94 extending out of a receiving recess formed in the exterior of housing 52. Consequently when bolts 88 and 89 are threadably received within threaded hole 102, 103 formed in housing 24, the first section 93 contacts sealing ring 94 to compress cartridge 22 into contact with inlet port housing 28.

Figure 6:
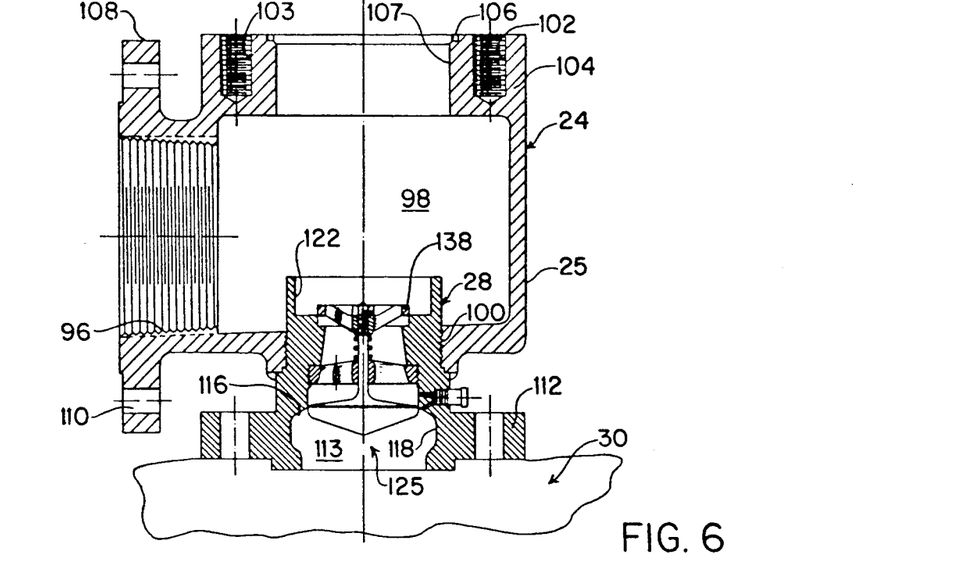
FIG. 6 shows a cross-sectional view of the present invention with the relief valve cartridge completely withdrawn.

Referring to FIGS. 2-5 and, more particularly, FIG. 6, valve bowl 24 has housing 25 with fluid outlet passageway 96 opening into hollow interior 98. Housing 25 includes a threaded aperture 100 with a central axis that is transverse to the central axis of outlet passageway 96. Within upper section 104 is formed threaded bolt holes 102, 103. Seal 106 is provided at the upper rim of cartridge alignment hole 107. Housing 24 also includes flange 108 to which is attached an exhaust conduit (not shown). Inlet port housing 28 is received within threaded aperture 100, which forms an integral component of valve bowl 24. Alternatively, inlet port housing can be formed as a unitary member of valve bowl housing 25 (e.g. single casted member). Inlet port housing 28 includes flange 112 with bolt holders for connection with fluid pressure source 30. Inlet port housing 28 also includes inlet port 113 which has a central axis parallel with the central axis of aperture 100 and hole 107 and, more preferably, is in common therewith. Inlet port 113 is formed with widened section 118 which includes valve seat surface 116.

Figure 7:
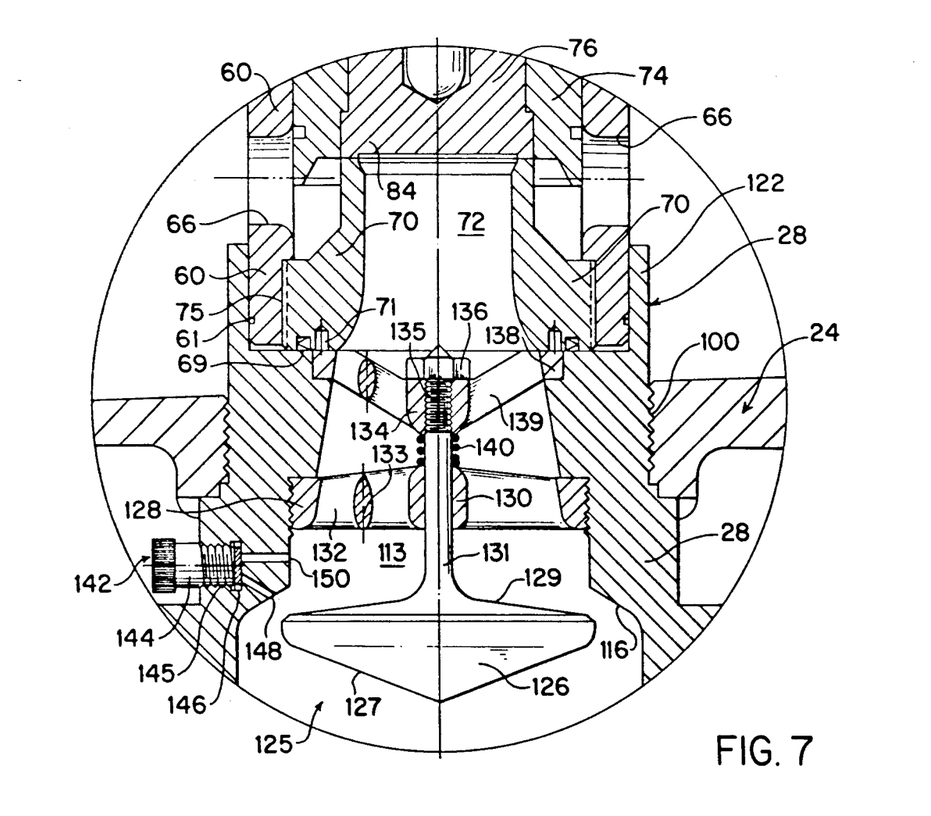
FIG. 7 shows an enlarged cross-sectional view of the inlet port area of the present invention.

FIGS. 6 and 7 show stop valve assembly 125 which comprises stop valve poppet 126 with a head member having an upstream flow surface 127 and a sloping contact surface 129. Valve poppet assembly 125 is centrally positioned within inlet port 113 and is designed to shift axially from a sealing position wherein contact surface 129 is compressed against seat surface 116 (FIG. 6) to a non-sealing position wherein contact surface 129 is positioned below seat surface 116 (FIG. 7).

Stop valve assembly 125 includes an externally threaded shroud 128 which is threadably fixed within a recessed ring formed in inlet port housing 28. Externally threaded shroud 128 has a central sliding hub 130 supported by a plurality of radial extending support vanes 132. Cross radial support vanes 133 can also be provided if additional support is desired. Slidingly received within hub 130 is stem 131 of valve poppet 126. Stem 131 extends downstream and has at its downstream end threaded section 135. Threaded section 135 is threadably attached to threaded hub 134 and locked in position by lock nut 136.

Threaded hub 134 is supported by radial vanes 139 (FIG. 7) which in turn support shroud 138. Shroud 138 is non-threaded and slidingly received within a recess formed in inlet port housing so as to be in contact with the upstream end of cartridge 22 and, most preferably, with the upstream end of nozzle member 70 when cartridge 22 is secured in position. The recesses formed in the inlet port housing to receive the shrouds are preferably formed deep enough such that the interior surface of the shrouds does not obstruct the flow passage but, rather, is coplanar or co-extends with the inlet port passageway. Spring 140 is positioned between hubs 130 and 134 and arranged so as to be in a compressed state when cartridge 22 is secured in position.

FIG. 7 illustrates seal 61 positioned between the interior surface of the cylindrical wall 122 and the exterior of guide member 60. FIG. 7 also illustrates pressure equalization system 142 which comprises plug 144 with end seal member 146 threadably received within threaded plug hole 145 formed in inlet port housing 28. Fluid conduit 150 opens into inlet port 113 from a point downstream of poppet valve 126 and opens into the threaded hole 145. A second fluid conduit 148 opens into the inlet port at a position upstream of valve poppet 126 when valve poppet 126 is in its sealing position. The opposite end of fluid conduit 148 also opens into threaded hole 145. When plug 144 is in position, seal 146 blocks fluid communication between fluid communication lines 148 and 150.

The process of servicing relief valve systems utilizing the apparatus of the present invention is now described with reference to FIGS. 3-5. FIG. 3 shows the normal operating position of the relief valve system 20. As shown in FIG. 3, releasable securement means 26 is in a securement mode such that cartridge 22 is maintained in a compressed state with a reception surface formed in inlet port housing 28. The upstream end of cartridge 22 is also positioned within the complimentary cylindrical recessed guide 122. In this position, nozzle member 70 acts to compress spring 140 such that valve poppet 126 is in a non-sealing position. Thus, if an overpressure occurs in the fluid pressure source 130, the increase in pressure will cause the disk 76 to lift and pre-set biasing means 56 to compress. The fluid then passes over valve seat 84, past disk holder 74, through the radial guide port or ports and out fluid outlet passageway 96. Under normal pressure relief valve operation conditions the influence of the stop valve on pressure relief valve performance is minimized with the design of the present invention such that the performance is similar to that of a relief valve system without a stop valve. During normal operation plug 144 is in a sealing position.

When replacement of a cartridge for testing and servicing is desired, releasable securement means 26 is disengaged by unthreading the fastening bolts (e.g. 88 and 89).

FIG. 4 illustrates the initial disengagement of cartridge 22 from its normal operating position within recessed guide 122. By unscrewing the top bolts holding the cartridge against the biasing system's induced upward force, the stop valve poppet 126 changes its axial position by moving upward. At this time there is not yet any pressure differential acting on the immersed poppet valve 126 as there exists equal static pressure on all sides of the immersed poppet valve. While the stop valve poppet 126 is moving to its sealing position and the end of cartridge 22 is still within recessed guide, the lack of any pressure differential between the fluid downstream and upstream of the head member of the poppet valve helps to avoid poppet valve dynamics (e.g. valve instability leading to repeated impact on seat 116). O-ring 61 maintains the valve leaktight during the extraction of the cartridge until the head member of valve 126 is touching seal 126.

As soon as a slight pressure differential over the sealed poppet valve 126 is created by the spillage occurring shortly after cartridge 22 is extracted to the extent that upper O-ring 61 (FIG. 7) ceases to seal, the poppet is loaded and closes leaktight. At the time O-ring 61 ceases to seal, a limited amount of spillage and depressurization of the fluid located immediately downstream of the sealing valve poppet occurs. The upstream side of the poppet valve is thus subject to the pressure of the vessel while the downstream side is at atmospheric pressure which causes the stop valve to be in a closed tight, sealing position.

The cartridge pressure relief valve can thus be completely extracted from valve bowl 24 by completely unscrewing the screwing bolts (two of four shown 88, 89). Essentially the only spillage which occurs in the removal of cartridge 22 is the fluid content of nozzle-member 70 and the inlet port section downstream of stop valve 26. During the removal of cartridge 22 plug 144 is maintained in its sealing position.

Immediately after the cartridge extraction, another new and preferably identical cartridge is inserted in the cylindrical recessed guide 122. (There is the possibility that an operator might want to change the pressure in the fluid system and insert a cartridge having a different pressure setting (e.g. different "K" valve for the main spring) but a similar exterior and interior configuration.) By tightening the bolts (e.g. 88 and 89) with a torque wrench a predetermined torque value is eventually reached corresponding with a compression force value on the biased stop valve. During the tightening of the bolts, cartridge 22 is already engaged leaktight inside the cylindrical guide recess 122 by use of seal 61 and seal 69.

To avoid large stresses on pusher shroud 138 and on the redial-axial vanes, the pressure upstream and downstream of the closed stop valve must be equalized prior to the securement of a new cartridge in position. By-pass valve 142, which comprises fluid conduits 148 and 150, plug 144, and hole 145, is provided to achieve such pressure equalization. Pressure equalization is achieved by unscrewing plug 144 after the replacement cartridge is received in sealed fashion within guide 122 but before the replacement cartridge is placed in contact with the stop valve. By opening the by-pass valve, the pressure becomes the same both upstream and downstream of the stop valve 126 and thus the only forces acting on the stop valve poppet 126 are the stop valve closing spring force and the stop valve opening force produced by the descending cartridge pressing on the pusher shroud of the stop valve. The entire static fluid pressure on the disk valve can be balanced and eventually surpassed by tightening the bolts securing the cartridge to the valve bowl.

Eventually the pusher shroud will descend in its cavity and stop valve 126, already not leaktight, starts to open. The poppet moves towards its initial position and the upstream end of nozzle member 70, containing face seal 69, seals against recess guide 122. At this point, relief valve system 20 is again returned to the normal operation mode.

Operation of by-pass valve 142 is further appreciated by the reference to the pressure values for pressure points P1, P2, and P3 during the servicing of the valve system. As shown in FIG. 3, during normal operation, pressure points P1 and P2 have a value equal to the pressure of the fluid in fluid pressure source 30 while pressure point P3 is equal to the pressure of the fluid in exhaust outlet 96 (e.g. air at atmospheric pressure) which is lower than the pressure of the fluid in pressure source 30.

When cartridge 22 is in the initial stages of disengagement as shown in FIG. 4, stop valve 126 begins to seal off inlet port 113 and cartridge 22 is in sealing contact within guide recessed 122. At this stage, the pressure at pressure points P1 and P2 remains at about the pressure of fluid pressure vessel 30 and P3 remains unchanged.

Eventually the upstream end of cartridge is withdrawn sufficiently to break the seal existing between cartridge 22 and guide recessed 122. When the seal is broken, P1 remains at the vessel pressure, P3 remains at the exhaust conduit pressure and P2 changes from the pressure of the fluid pressure source to the pressure of the exhaust conduit. In this way the pressure differential helps maintain a tight seal between stop valve 126 and seat 116.

After inserting a new cartridge into guide recess 122 a seal is once again created between cartridge 22 and recess guide 122. At this point, plug 144 is partially withdrawn so as to enable fluid communication through communication lines 148 and 150. The partial removal of plug 144 causes an equalization of pressure at points P1 and P2 to the pressure of fluid pressure source 30. The equalization of pressure avoids the creation of high stress on the stop valve assembly as the poppet valve is forced into its normal operating position.

The above arrangement thus allows for a field operator to service a relief valve system in a brief amount of time (e.g. one to three minutes which is less than the minimum pressure response time) while the normal flow process remains uninterrupted in fluid pressure source 130. Also, such a quick switchover minimizes the risk of not having a relief valve in position during the servicing period and lessens labor costs. Moreover, by designing a multitude of the present invention's cartridges with the same external configuration but with different settings (e.g. different sized biasing means) it is possible to provide a high degree of versatility to users of such relief valve systems as any one of a number of different pressure-set cartridges can be inserted into the same valve bowl casing. For example, if a plant decides to lower normal operating pressure and also the disk lift pressure, a different cartridge can easily be inserted while relying on the same valve bowl positioned in line. Such an arrangement also drastically reduces cost to the plant operator as replacing only the cartridges is a lot less expensive then the cartridge/valve bowl combination.

Although the present invention has been described with reference to a preferred embodiment, the invention is not limited to the specific details thereof. Various substitutions and modifications will occur to those of ordinary skill in the art, and all such substitutions and modifications are intended to fall within the spirit and scope of the invention as defined in the appended claims.

What is claimed is:

1. A method for servicing a pressure relief valve positioned within a relief valve system, comprising:
   releasing releasable securement means securing an upstream end of a relief valve cartridge within a hollow interior formed in a valve bowl, with said relief valve cartridge including a spring biased stem in contact with a valve disk, said relief valve cartridge including a guide member surrounding said valve disk and having an upstream open end and one or more radial ports positioned downstream from said upstream open end, said relief valve cartridge further including a nozzle member having an upstream open end and a downstream open end adapted to be covered by said valve disk;
   removing said relief valve cartridge such that the upstream end of said relief valve cartridge is positioned outside of the hollow interior formed in said valve bowl while maintaining said spring biased stem in contact with said valve disk and said valve disk biased in sealed contact with the downstream end of said nozzle member, and said step of removing said relief valve cartridge out of the hollow interior formed in said valve bowl resulting in a stop valve, previously biased by the upstream end of said relief valve cartridge in a non-sealing position, moving to a sealing position with respect to an inlet port extending into the hollow interior of said valve bowl; and said step of releasing said releasable securement means includes detaching a ring, having a central axis parallel with the central axis of the aperture formed in said valve bowl and an interior surface in contact with a housing of said relief valve cartridge, from engagement with said valve bowl.

2. A method as recited in claim 1, wherein said valve bowl includes an inlet port housing having a recessed guide positioned within said hollow interior so as to have a downstream rim positioned upstream from said one or more radial ports formed in said guide member, and said step of removing said relief valve cartridge includes sliding the upstream end of said guide member within said recessed guide such that the upstream end of said guide member is positioned downstream from the downstream rim of said recessed guide.

3. A method as recited in claim 2, wherein said step of removing said relief valve cartridge includes sliding the upstream end of said guide member out of an aperture formed in said valve bowl with a central axis parallel with the central axis of said recessed guide.

4. A method as recited in claim 1, wherein said step of removing said relief valve cartridge includes moving the nozzle member, which has an upstream end commensurate with an upstream end of said guide member, from a position wherein said nozzle is in contact with said stop valve to a position wherein said nozzle is free from contact with said stop valve.

5. A method as recited in claim 4, wherein said stop valve includes a poppet valve with a spring biased cylindrical shroud with radial support vanes attached to a downstream end of a stem extending from a valve head of said poppet valve, and said step of removing said nozzle member out of contact with said stop valve includes moving said nozzle member out of contact with the cylindrical shroud of said stop valve.

6. A method as recited in claim 1, further comprising inserting a pretested second relief valve cartridge into the same position said first relief valve cartridge had originally assumed.

7. A method as recited in claim 6, further comprising resecuring said releasable securement means such that said second relief valve cartridge is secured in position with an upstream end of said second relief valve cartridge in line with the inlet port extending into the hollow interior of said valve bowl.

8. A method as recited in claim 6, further comprising moving a sealing plug such that relatively high pressured fluid positioned upstream of said stop valve in an inlet port sealing position flows around said stop valve and into a lower pressure section of said inlet port downstream of said stop valve so as to reduce the pressure differential upstream and downstream of said stop valve.

9. A method as recited in claim 8 wherein said step of moving said sealing plug is conducted between the time the upstream end of said replacement cartridge is placed within a recessed guide formed in an inlet housing of said valve bowl and the time said replacement cartridge contacts and compresses said stop valve.

10. A method for servicing a relief valve system comprising:

sliding a relief valve cartridge within a recessed guide formed in a valve bowl, said cartridge including an upstream end with a seal extending about its outer periphery and said seal being in contact with an interior wall of said recessed guide when said cartridge is received within said recessed guide, and said step of sliding said relief valve cartridge causing a biased stop valve to come in contact with a seat surface in said valve bowl so as to discontinue fluid flow through an inlet port formed in said valve bowl;

further sliding said relief valve cartridge within the recessed guide until the seal is no longer in contact with the interior wall such that fluid pressure previously existing between the stop valve in contact with the seat and said seal is released to a lower pressure area and the stop valve is further biased shut.

11. A method as recited in claim 10 further comprising the step of inserting the upstream end of a replacement cartridge within said recessed guide such that a seal formed on the outer periphery of the upstream end of said replacement cartridge is placed in contact with the interior wall;

opening a by-pass valve so as to pass high pressure fluid from a fluid source to a low pressure area formed downstream of said stop valve and upstream of said seal;

further inserting said replacement cartridge in said valve bowl until the upstream end of said replacement cartridge contacts said stop valve and said stop valve is biased open; and securing said cartridge to said valve bowl such that said stop valve is maintained in a biased open state.

12. A self-contained relief valve cartridge, comprising:

a housing having a guide member section at an upstream end, said guide member section including an open upstream end and a fluid port extending radially through said guide member;

a disk positioned within said housing;

biasing means positioned within said housing, said biasing means being in contact with said disk;

a nozzle member secured to said guide member between said open end of said guide member and said fluid port, said nozzle member including a disk seat, and said biasing means biasing said disk into contact with the valve seat of said nozzle member, and said relief valve cartridge further comprising a diskholder slidingly retained between an interior surface of said guide member and an exterior surface of said disk and having a free end which is adapted to partially block the fluid port formed in said guide member, wherein said disk supports said diskholder and said diskholder is secured to said disk by a spring member such that said diskholder is adapted to move with respect to said guide member and with respect to said disk.

13. A pressure relief valve system, comprising:

a valve bowl which comprises an inlet port housing with an inlet port adapted for fluid communication with a fluid pressure source and an outlet port, said valve bowl having an aperture formed therein and means for securing said valve bowl to the fluid pressure source;

a relief valve cartridge having a housing with a biasing means positioned therein, said housing including a guide member having an open upstream end and a fluid opening formed therethrough and positioned downstream from said open upstream end, said cartridge further comprising a disk in sliding arrangement within said guide member, and a nozzle member retained within the interior of said guide member, and said biasing means adapted to bias said disk into contact with said nozzle member; and releasable securement means for releasably securing said cartridge of said valve bowl such that said cartridge extends through the aperture formed in said valve bowl and into fluid communication with the inlet port of said valve bowl, and wherein said releasable securement means includes a ring with an interior surface adapted for contact with an exterior surface of said cartridge and fastening means for fastening said ring to said valve bowl while urging the open end of said guide member into contact with a reception surface of said inlet port.

14. A pressure relief valve as recited in claim 13, wherein said nozzle member has an upstream end essentially coplanar with the upstream end of said guide member.

15. A pressure relief valve as recited in claim 13, wherein said nozzle member is secured to the interior surface of said guide member and includes a valve seat at a downstream end of said nozzle member, and said valve seat being positioned such that a plane lying flush on said valve seat extends through the fluid opening formed in said guide member.

16. A pressure relief valve as recited in claim 15, wherein said nozzle member is threadably engaged with said guide member and has an upstream end which is essentially commensurate with the upstream end of said guide member.

17. A pressure relief valve as recited in claim 13, wherein said inlet port includes a downstream reception end with a recessed guide defined by an interior wall adapted to receive the open end of said guide member.

18. A pressure relief valve as recited in claim 13, further comprising an elastomeric ring positioned between said ring and the exterior surface of said cartridge.

19. A pressure relief valve system as recited in claim 13 further comprising a first seal member and said valve bowl including an inlet port housing having a recessed guide, said recessed guide including a reception surface and wall which are adapted to receive the upstream end of said cartridge, and said first seal member being positioned between said guide member and said wall.

20. A method for servicing a pressure relief valve positioned within a relief valve system, comprising:

releasing releasable securement means securing an upstream end of a relief valve cartridge within a hollow interior formed in a valve bowl, with said relief valve cartridge including a spring biased stem in contact with a valve disk, said relief valve cartridge including a nozzle member having an upstream open end and a downstream open end adapted to be covered by said valve disk;

removing said relief valve cartridge such that the upstream end of said relief valve cartridge is positioned outside of the hollow interior formed in said valve bowl while maintaining said spring biased stem in contact with said valve disk and said valve disk biased in sealed contact with the downstream end of said nozzle member, and said step of removing said relief valve cartridge out of the hollow interior formed in said valve bowl resulting in a stop valve, previously biased by the upstream end of said relief valve cartridge in a non-sealing position, moving to a sealing position with respect to an inlet port extending into the hollow interior of said valve bowl, and said step of removing said relief valve cartridge includes moving the nozzle member from a position wherein said nozzle is in contact with said stop valve to a position wherein said nozzle is free from contact with said stop valve and wherein said stop valve includes a poppet valve with a spring biased cylindrical shroud with radial support vanes attached to a downstream end of a stem extending from a valve head of said poppet valve, and said step of removing said nozzle member out of contact with said stop valve includes moving said nozzle member out of contact with the cylindrical shroud of said stop valve.

21. A method for servicing a pressure relief valve positioned within a relief valve system, comprising:

releasing releasable securement means securing an upstream end of a relief valve cartridge within a hollow interior formed in a valve bowl, with said relief valve cartridge including a spring biased stem in contact with a valve disk, a nozzle member having an upstream open end and a downstream open end adapted to be covered by said valve disk;

removing said relief valve cartridge such that the upstream end of said relief valve cartridge is positioned outside of the hollow interior formed in said valve bowl while maintaining said spring biased stem in contact with said valve disk and said valve disk biased in sealed contact with the downstream end of said nozzle member, and said step of removing said relief valve cartridge out of the hollow interior formed in said valve bowl resulting in a stop valve, previously biased by the upstream end of said relief valve cartridge in a non-sealing position, moving to a sealing position with respect to an inlet port extending into the hollow interior of said valve bowl, said method further comprising moving a sealing plug such that relatively high pressured fluid positioned upstream of said stop valve in an inlet port sealing position flows around said stop valve and into a lower pressure section of said inlet port downstream of said stop valve so as to reduce the pressure differential upstream and downstream of said stop valve.

22. A pressure relief system, comprising:

a valve bowl which comprises an inlet port housing with an inlet port adapted for fluid communication with a fluid pressure source and an outlet port, said valve bowl having an aperture formed therein and means for securing said valve bowl to the fluid pressure source;

a relief valve cartridge having a housing with a biasing means positioned therein, said housing including a guide member having an open upstream end and a fluid opening formed therethrough and positioned downstream from said open upstream end, said cartridge further comprising a disk in sliding arrangement within said guide member, and a nozzle member retained within the interior of said guide member, and said biasing means adapted to bias said disk into contact with said nozzle member; and releasable securement means for releasably securing said cartridge of said valve bowl such that said cartridge extends through the aperture formed in said valve bowl and into fluid communication with the inlet port of said valve bowl, said pressure relief valve system further comprising a stop valve system which comprises a contact member, a valve head member, attachment means for connecting said head member to said contact member, and a biasing system, said contact member being in contact with the upstream end of said cartridge and said biasing system being in a compressed state when said cartridge is secured to said valve bowl such that said head member is in a non-sealing inlet port position, and said head member being dimensioned and arranged such that when said cartridge is removed from said valve bowl said biasing system decompresses so as to position said head member in a sealing position with respect to said inlet port, and said pressure relief valve system further comprising a first fluid communication line formed in said inlet port housing and having a first end opening in said inlet port upstream of said head member when said head member is in a sealing position, and a second fluid communication formed in said inlet port housing and having a first end opening into said inlet port downstream of said head member, and said first and second fluid communication lines each having a second end opening into a recess formed in said inlet port housing, and said pressure relief valve member further comprising a sealing plug which is adapted to assume a first position wherein the second ends of said first and second fluid communication lines are sealed and a second position wherein said first and second fluid communication lines are in fluid communication with one another.

* * * * *